United States Patent [19]

Grooms et al.

[11] Patent Number: 5,429,702

[45] Date of Patent: Jul. 4, 1995

[54] METHOD FOR SEALING AN INNER BAG TO AN OUTER CONTAINER

[75] Inventors: John P. Grooms, Cincinnati, Ohio; Larry J. Mattson, Charlotte, N.C.; Michael E. Hilton, Cincinnati; Ronald W. Kock, Wyoming, both of Ohio

[73] Assignee: The Procter & Gamble Company, Cincinnati, Ohio

[21] Appl. No.: 271,802

[22] Filed: Jul. 7, 1994

[51] Int. Cl.$^6$ .......................................... B32B 31/28
[52] U.S. Cl. .................... 156/272.4; 156/275.1; 156/275.3; 156/379.8; 156/287; 156/69; 156/293; 156/294; 156/156; 222/95; 222/386.5
[58] Field of Search ............... 156/275.3, 275.1, 272.4, 156/379.8, 287, 69, 293, 294, 514, 156; 222/95, 105, 386.5

[56] References Cited

U.S. PATENT DOCUMENTS

| | | | |
|---|---|---|---|
| 2,613,169 | 10/1952 | Cunningham | 156/69 |
| 2,743,038 | 4/1956 | Ferries | 222/95 |
| 3,461,014 | 8/1969 | James | 156/272 |
| 3,560,295 | 2/1971 | Kimbrell et al. | 156/287 |
| 3,738,892 | 6/1973 | Curcio | 156/380 |
| 3,808,074 | 4/1974 | Smith et al. | 156/69 |
| 3,945,539 | 3/1976 | Sossong | 222/386.5 |
| 3,981,418 | 9/1976 | Williamson et al. | 222/386.5 |
| 3,988,185 | 10/1976 | Johnson et al. | 156/69 |
| 4,109,815 | 8/1978 | Collins, III | 215/232 |
| 4,154,366 | 5/1979 | Acres | 222/95 |
| 4,169,004 | 9/1979 | Kock et al. | 156/227 |
| 4,180,961 | 1/1980 | Collins, III | 53/421 |
| 4,658,989 | 4/1987 | Bonerb | 222/105 |
| 4,704,509 | 11/1987 | Hilmersson et al. | 219/10.53 |
| 4,754,113 | 6/1988 | Mohr et al. | 219/10.79 |
| 4,842,165 | 6/1989 | Van Coney | 222/95 |
| 4,865,224 | 9/1989 | Streck | 222/95 |
| 4,892,230 | 1/1990 | Lynn, Jr. | 222/105 |
| 4,994,637 | 2/1991 | Fang et al. | 219/10.53 |
| 5,145,083 | 9/1992 | Takahashi | 220/206 |
| 5,158,370 | 10/1992 | Jacobi | 383/48 |
| 5,191,181 | 3/1993 | Regenscheid | 219/10.41 |
| 5,198,053 | 3/1993 | Duncan | 156/64 |
| 5,200,587 | 4/1993 | Fang | 219/10.53 |
| 5,305,909 | 4/1994 | Merritt | 222/386.5 X |

FOREIGN PATENT DOCUMENTS

| | | | |
|---|---|---|---|
| 178820 | 11/1982 | Japan | 156/272.4 |
| 128815 | 8/1983 | Japan | 156/294 |
| 374483 | 2/1964 | Switzerland | 156/294 |

*Primary Examiner*—David A. Simmons
*Assistant Examiner*—Steven J. Helmer
*Attorney, Agent, or Firm*—Ronald W. Kock; Michael E. Hilton

[57] ABSTRACT

A process for forming, handling, affixing, and inverting a thin plastic half bag to a continuous inner side wall of an outer plastic container. A non-metallic mandrel is used as a tool for thermoforming a half bag over the top of the mandrel. The top of the mandrel with bag attached is inserted into an open end of the outer plastic container. A continuous stripe of heat-activated adhesive containing metal particles is bonded to the exterior of the half bag at the open end of the half bag. When the half bag is inserted, the stripe of adhesive is positioned near the midpoint of the container. A magnetic induction field generated near the container midpoint heats the metal particles in the heat-activated adhesive, thereby activating the adhesive. When the adhesive has been heated, compressed air is blown from the mandrel to press the bag and adhesive against the inner side wall of the outer container to cause bonding between them. After the field is removed and the adhesive cools, the mandrel is withdrawn from the thin plastic bag. Vacuum applied to the closed end of the bag from the top of the mandrel causes the bag to be inverted to the open end of the container as the mandrel is withdrawn.

21 Claims, 2 Drawing Sheets

METHOD FOR SEALING AN INNER BAG TO AN OUTER CONTAINER

FIELD OF THE INVENTION

The present invention relates to processes for induction sealing plastic parts to each other, and more particularly to such processes wherein an adhesive containing metal particles contacting the plastic parts is heated by a magnetic induction field to seal the plastic parts together. Even more particularly, the present invention relates to processes for sealing an inner bag to an inner side wall of an outer container.

BACKGROUND OF THE INVENTION

Induction sealing plastic parts together by heating metal embedded in one of the plastic parts, or by heating metal components clamping the parts together, is old in the art. Heat is developed by generating a high frequency oscillating magnetic field in the presence of the metal. Depending on the metal, either eddy current losses or magnetic hysteresis losses are believed responsible for heating the metal. Heat from the metal is then conducted through the plastic parts to their sealable interface. Plastics may melt or become tacky due to the conducted heat. If the plastic materials are compatible and sufficient pressure is applied, the plastic parts can be bonded together. Once the magnetic induction field is removed, the heat may be dissipated from the sealable interface through the plastic parts. Cooling the sealable interface under pressure is generally required to produce a strong seal. The great benefit of the induction heating process is that heat can be quickly generated so that high production rates can be achieved.

Processes for sealing webs together using induction sealing are also old in the art. For example, U.S. Pat. No. 3,461,014 to James discloses a process in which ferrous oxide particles small enough to be mixed with conventional printing ink are printed onto a substrate. The substrate and web are combined and passed through a magnetic induction field to heat the ferrous oxide particles between the substrate and web. Then the web and substrate are passed through a pair of "squeeze rollers" to generate sufficient pressure to seal the webs together.

In the present invention metal particles are preferably added to a heat-activated adhesive, such that when the adhesive is placed between two plastic parts, the adhesive is induction heat-activated to bond the two plastic parts together.

Squeezebottle dispensers having fluid-containing, flexible inner bags within them are common in the art. When a squeezebottle dispenser is squeezed, fluid is forced from the flexible inner bag through a discharge opening at the top of the dispenser. Valving in the dispenser enables air to be compressed within the squeezebottle during squeezing, but valving then allows air to vent into the bottle to replace the dispensed fluid after the squeezebottle is released. Repeated squeezing cycles cause the flexible inner bag to collapse around the fluid within the squeezebottle as the flexible inner bag empties.

A problem with such dispensers is that a flexible inner bag tends to collapse most quickly near its discharge opening. This is believed to be due to higher velocity fluid flow near the discharge opening causing lower static pressure there. Fluid flow may be choked off from the rest of the flexible inner bag if the flexible inner bag collapses prematurely near the discharge opening. To correct this problem, the manner in which the flexible inner bag can collapse is generally controlled. For example, a flexible inner bag may be designed to collapse radially about a perforated diptube connected to the discharge opening of the squeezebottle. In some circumstances, for example, when the fluid is highly viscous like toothpaste, diptubes generally provide too much resistance to fluid flow through them. For such fluids, which have viscosities great enough that they cannot flow under gravity, another collapse control approach is often used. That is, a flexible inner bag is affixed to the upper half of the inside of a squeezebottle so that the flexible inner bag can collapse by inverting axially toward the discharge opening. Flexible inner bag inversion offers minimum flow resistance.

For squeezebottle dispensers having flexible inner bags which invert toward the discharge opening, there is often a construction problem involved with inserting and affixing the flexible inner bag inside the squeezebottle. Affixing the bag typically involves heat sealing. The finish of the squeezebottle usually has a discharge opening smaller in circumference than the body of the squeezebottle so that the bottle finish may later be capped with a reasonably sized closure. If the flexible inner bag is inserted into the squeezebottle From a small diameter discharge opening, it may be difficult to insert a heat sealing tool into the flexible inner bag to seal the flexible inner bag to the upper half of the squeezebottle. A sealing tool would be expected to expand to press the flexible inner bag against the inner side wall of the squeezebottle. A reliable, high speed method for affixing a flexible inner bag to the inside of a squeezebottle, using an expanding tool, has been unavailable in many cases.

Alternatively, if the bag is inserted from the opposite end of the squeezebottle, which is usually the bottom of the squeezebottle, the bag must later be filled and sealed closed from the bottom end, and a bottom piece must be added to close the open bottom of the squeezebottle. For example, twisting the open end of the bag after filling and then heat sealing the twisted portion is one approach to closing a filled bag. Closing the bag after filling may also be a slow and difficult process.

One solution to the bag filling and closing problem is a construction that seals a half bag to the midline circumference of a squeezebottle. A half bag may be inserted from the open bottom of the squeezebottle with its closed end at the discharge opening of the squeezebottle. After sealing the open end of the half bag to the midline circumference of the squeezebottle, the half bag may then be inverted so that its closed end is positioned at the bottom of the squeezebottle. Filling may then be accomplished from the discharge opening of the dispenser. Such a construction requires a complete seal around the midline circumference of the squeezebottle.

The half bag approach enables conventional high speed filling without subsequent bag closing and sealing. However, the half bag approach also requires the formation and handling of a half bag and the inversion of the half bag after sealing it to the squeezebottle. Bag forming and internal sealing operations may be complex and difficult even when performed manually.

SUMMARY OF THE INVENTION

One preferred embodiment of the present invention is a method for sealing a thin plastic bag to a continuous inner side wall of an outer plastic container. The outer plastic container has an open bottom end, a discharge opening, and a midpoint. The method comprises steps which include placing the plastic bag over a non-metallic mandrel. The mandrel has a top end and radial passages connected to a source of compressed air. The radial passages are positioned just inside the thin plastic bag. The plastic bag is closed at the top end of the mandrel and it has a continuous stripe of heat-activated adhesive bonded near its open end. The stripe of heat-activated adhesive preferably contains metal particles in it. Another step inserts the top end of the mandrel with the plastic bag placed over it into the open bottom end of the outer plastic container. Still another step generates a magnetic induction field near the stripe of heat-activated adhesive at the midpoint of the outer container. The field has a strength that generates sufficient heat in the metal particles so that the heat from the metal particles activates the heat-activated adhesive. Yet another step presses the thin plastic bag and adhesive stripe against the continuous inner side wall by means of compressed gas or steam blown radially from the mandrel. The combination of heat and pressure causes the adhesive to affix the open end of the thin flexible bag to the midpoint of the outer plastic container.

This embodiment may further comprise steps including removing the magnetic induction field, retaining the mandrel inserted and blowing compressed air until the adhesive cools sufficiently that the mandrel may be withdrawn without disturbing the sealable interface, and finally withdrawing the mandrel from the thin plastic bag. The step of withdrawing the mandrel from the thin plastic bag may further include a step which inverts the thin plastic bag by an inverting means as the mandrel is withdrawn. That inverting means may include vacuum from holes in the top of the mandrel connected to a vacuum source, or just the rapid withdrawal of the mandrel. When the mandrel is rapidly withdrawn, the closed end of the bag maintains a substantially air-tight fit with the top end of the mandrel until the mandrel is nearly withdrawn, and the rapid withdrawal provides sufficient inertia to fully invert the bag.

The step of placing the plastic bag over a non-metallic mandrel may be accomplished by thermoforming the plastic bag onto the mandrel.

The thin plastic bag may comprise a half bag, which has an open end just below the midpoint of the outer plastic container when the mandrel is fully inserted into the outer plastic container.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
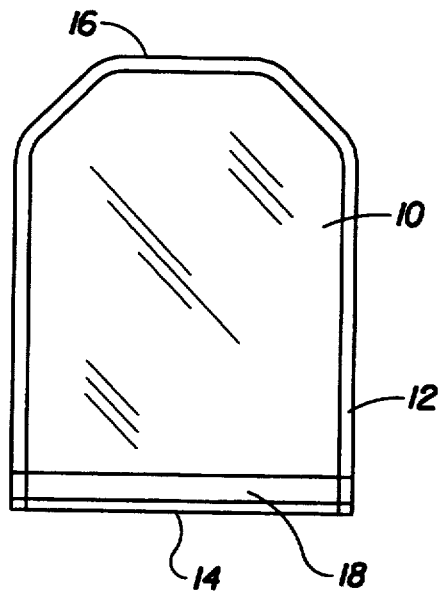
FIG. 1 is a front elevation view of a flat film bag having fin-seals all around, except for an open end where there is a stripe of adhesive bonded to the exterior of the bag.

Referring now to the drawings, and more particularly to FIG. 1, there is shown a thin flexible bag of the present invention, which is indicated as 10. Thin flexible bag 10 is preferably made from two pieces of flat film, or from a single piece of flat film folded in half, by fin-sealing edges 12 together all around except at an open end 14. Bag 10 has a closed end 16. Preferably while bag 10 is in the flat condition, a stripe of heat-activated adhesive 18 is bonded to both exterior surfaces of bag 10 adjacent open end 14. Stripe 18 extends across fin-sealed edges 12 so that when bag 10 is opened, stripe 18 is substantially continuous around the circumference of open end 14.

Figure 2:
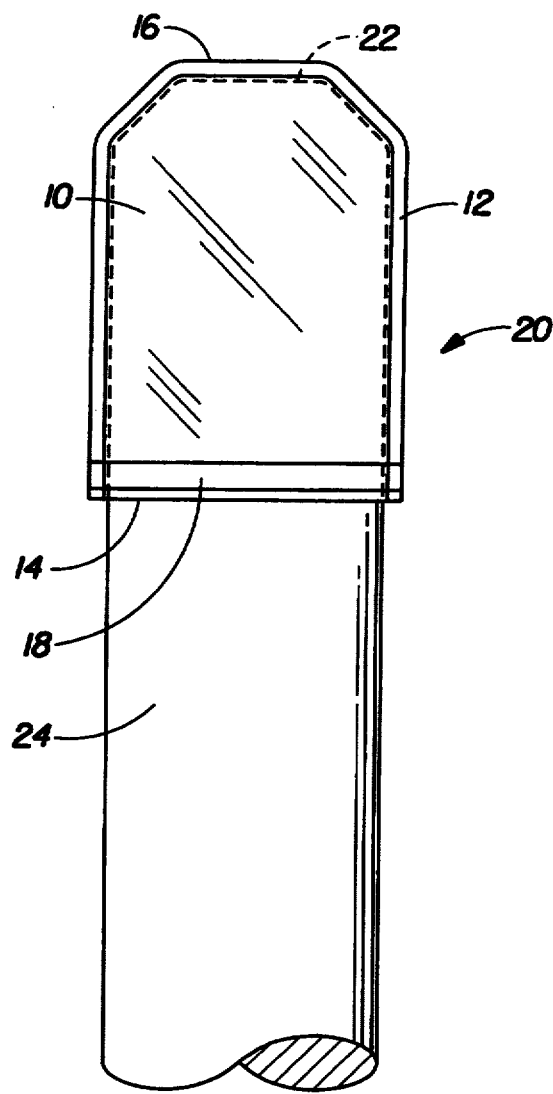
FIG. 2 is a partial front elevational view showing the bag of FIG. 1 placed over an upright mandrel.
Figure 3:
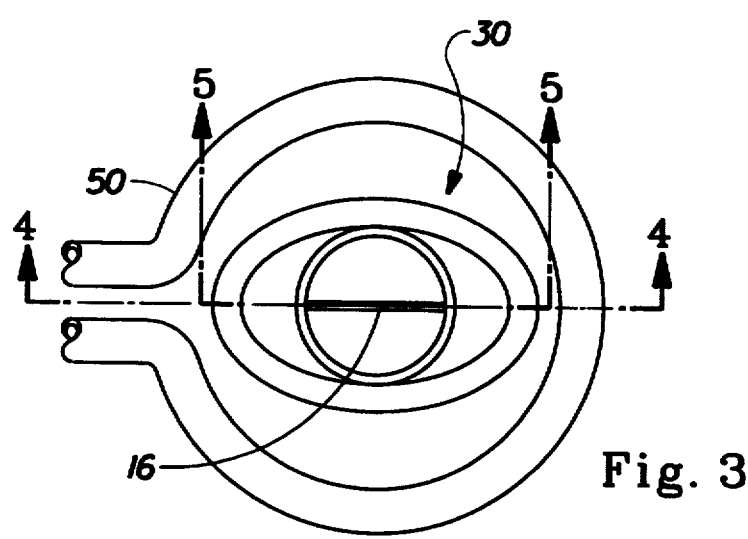
FIG. 3 is a top plan view of an oval squeezebottle set inside a circular induction coil.
Figure 4:
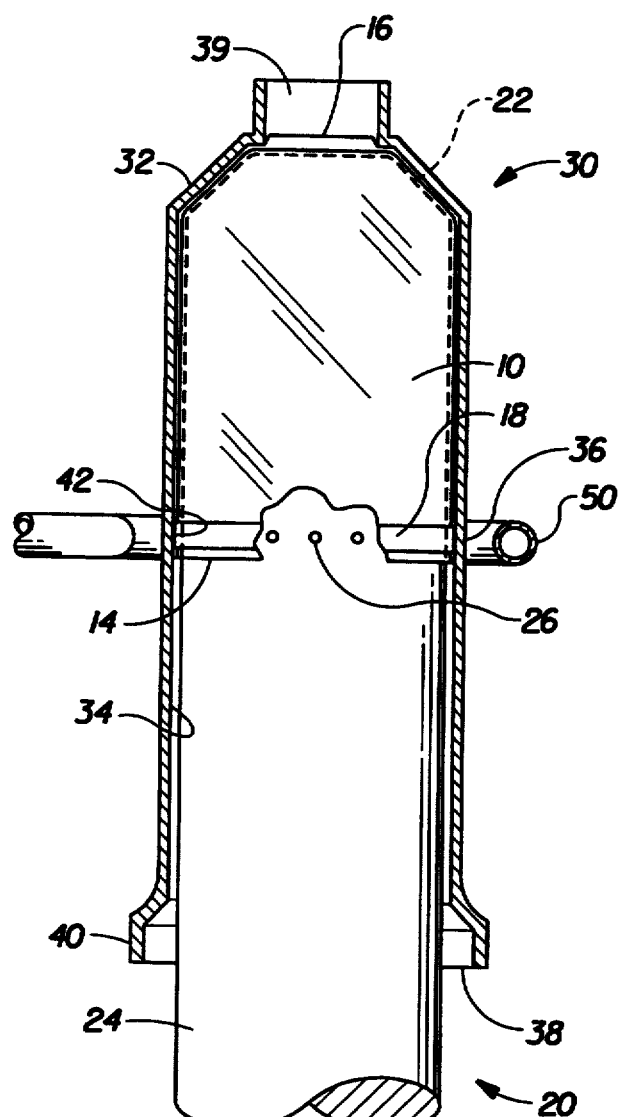
FIG. 4 is a sectioned partial front elevational view, taken along section line 4—4 of FIG. 3, showing the mandrel and bag of FIG. 2 inserted into the open end of an outer squeezebottle.
Figure 5:
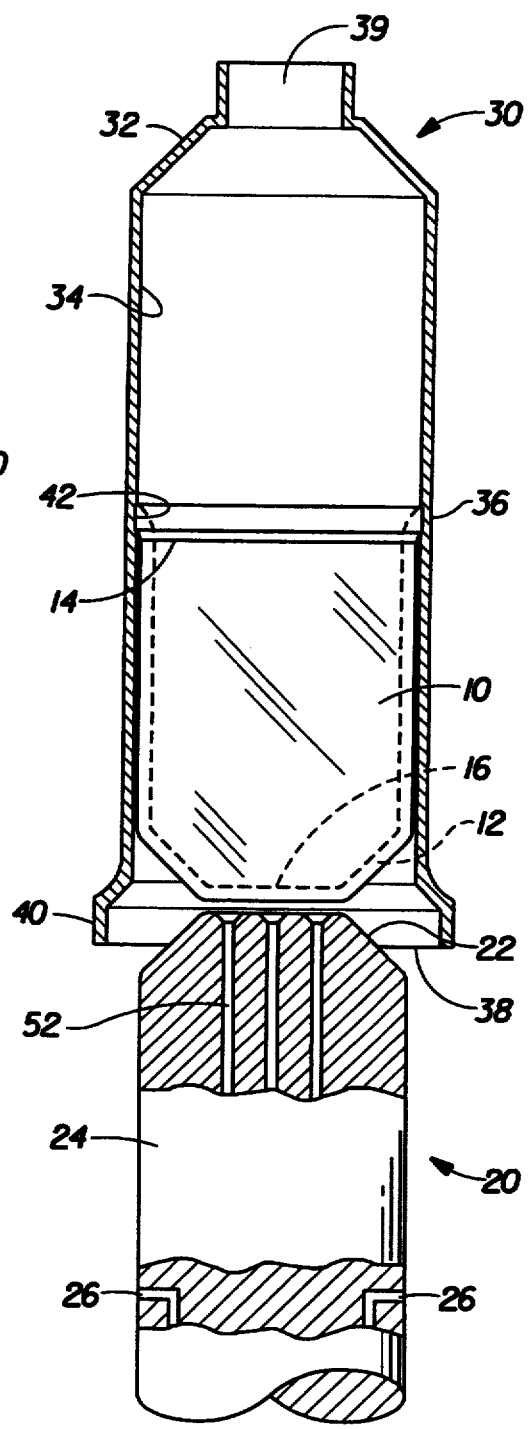
FIG. 5 is a sectioned partial front elevational view, taken along section line 5—5 of FIG. 3, showing the mandrel withdrawn and a half bag sealed to the midpoint of the squeezebottle and the bag inverted with its closed end at the bottom of the squeezebottle.

FIG. 2 shows bag 10 placed onto an upright mandrel 20. Mandrel 20 is typically a solid piece of non-metallic material, shaped to slidably fit inside an outer container 30, which is best seen in FIGS. 3, 4 and 5. When thin plastic bag 10 is placed fully onto mandrel 20, open end 14 is preferably half the length of outer container 30, thin plastic bag 10 being termed a "half bag". Outer container 30 is preferably made of plastic and has a shoulder 32, a continuous inner side wall 34 which depends from shoulder 32, and a midpoint 36 located at about half the length of outer container 30. Outer container 30 also has an open bottom end 38, a discharge opening 39, and a flared base 40.

Mandrel 20 has a top end 22 shaped to fit against the inside of shoulder 32 of outer container 30. Closed end 16 of bag 10 is also preferably shaped to fit snuggly against top end 22 of mandrel 20 in a substantially air-tight manner. Preferably outer container 30 and mandrel 20 have substantially the same cross-sections, which are circular, oval, or otherwise convex in shape. Mandrel 20 and continuous inner side wall 34 both may taper gently inward toward top end 22 and shoulder 32, or they may have no taper at all. Mandrel 20 also has an outer surface 24 and radial passages 26 opening into outer surface 24 at a location underneath adhesive stripe 18 of bag 10. Passages 26 extend all the way around mandrel 20. They are shown in FIGS. 4 and 5. Passages 26 are connected to a source of compressed air, not shown.

When mandrel 20 is placed fully into outer container 30, adhesive stripe 18 of bag 10 is positioned near midpoint 36 of outer container 30. A heat sealable interface 42 is created between thin plastic bag 10 and continuous inner side wall 34 where adhesive stripe 18 resides between them.

FIG. 3 shows oval outer plastic container 30 placed centrally inside at least one loop of an induction coil 50. Induction coil 50 is preferably a piece of copper tubing connected electrically to a Radio Frequency power generator, not shown. Induction coil 50 is also connected to a source of cooling water not shown. Cooling water passes through the inside of induction coil 50 while radio frequency power flows through and along the outer surface of induction coil 50. The effect of radio frequency power flowing through induction coil 50 is to create a magnetic induction field, not shown, around induction coil 50. Plastic outer container 30 does not contact induction coil 50; however, the proximity of induction coil 50 to outer container 30 is such that outer container 30 is fully within the magnetic induction field near midpoint 36. Alternatively, an induction field could be generated inside mandrel 20 if the size of mandrel 20 permitted.

Induction coil 50, placed near midpoint 36, generates a magnetic induction field outside outer container 30 reaching at least into adhesive stripe 18. The magnetic induction field is not disturbed by nor does it influence the non-metallic components within its range. However, metallic components, such as metal particles embedded in adhesive stripe 18 are heated by the field via magnetic hysteresis losses and/or eddy current losses. Different metals heat at different rates. Preferably ferrous oxide particles are used in adhesive stripe 18.

When metal particles are heated, their heat is conducted throughout adhesive stripe 18. Heat-activated adhesive stripe 18 then becomes tacky and easily wets surfaces in contact with it. When thin plastic bag 10 is pressed against continuous inner side wall 34 of plastic outer container 30 with tacky adhesive stripe 18 between them, bonding occurs at their sealable interface 42. Pressure internal to bag 10 from compressed air passing through radial passages 26 of mandrel 20 is preferably applied during adhesive heating and for a time even after the source of heating has been removed. Adhesive heating can be accelerated by the use of steam instead of compressed air during the heating stage. The compresses gas flows from the radial passages and then around the body of the mandrel and out the open end of the outer container, thereby flowing continuously and avoiding any significant pressure build-up.

Applying pressure is not believed to be essential during heating or after heat has been removed, but such pressure typically improves the strength of the bond. Because of the compressed gas blowing bag 10 away from surface 24 of mandrel 20, no significant induction heating occurs at the surface of the mandrel. However, the mandrel material is preferably designed to withstand cyclic heating.

The level of power delivered to induction coil 50 is controlled by a control means, not shown, such that it is turned on for only enough time to heat metal particles in adhesive stripe 18 sufficiently to transfer their heat to sealable interface 42 and cause activation of the adhesive there, but without melting through the continuous inner side wall 34 of outer container 30. Once adhesive stripe 18 has been sufficiently heated, the control means turns power off to induction coil 50. Adhesive stripe 18 immediately begins to cool and solidify. Although cooling is somewhat slower than heating, cooling only needs to occur until the bond at sealable interface 42 is stable enough to permit the removal of mandrel 20. After sufficient cooling, mandrel 20 is removed from outer container 30. Since adhesive stripe 18 is uninterrupted around bag 10, a complete, air-tight seal is produced at midpoint 36.

FIG. 5 shows outer container 30 ready to be filled with fluid after bag 10 is sealed therein. Also, FIG. 5 shows mandrel 20 as it is withdrawn from thin plastic bag 10 and plastic outer container 30. A fully circumferential seal between thin plastic bag 10 and inner side wall 34 has been formed at sealable interface 42. As mandrel 20 is withdrawn, it preferably pulls closed end 16 of thin plastic bag 10 with it. Vacuum holes 52 may be drilled into mandrel 20 and connected to a source of vacuum not shown. The source of vacuum is turned on when mandrel 20 is withdrawn, and then vacuum holes 52 are exhausted after thin plastic bag 10 has been fully inverted about the seal at midpoint 36, or turned inside out to where closed end 16 of bag 10 is at open bottom end 38 of the outer container. FIG. 5 shows thin plastic bag 10 fully inverted with fin-sealed edges 12 inside the inverted bag.

By having a half bag inverted inside outer container 30, significant bag material is saved compared to constructions in which a full bag is placed inside the outer container. Outer container 30 is preferably a squeezebottle. That is, inner side walls 34 are deformable. The purpose for sealing a half bag into the squeezebottle is to construct a pump that is capable of dispensing fluid from any orientation and which is always primed. To complete the pump construction, a bottom plate, not shown, is sealed to outer container 30 after mandrel 20 is withdrawn and bag 10 is filled. A bottom plate would preferably have a vent valve to permit air to be compressed between bag 10 and squeezebottle 30 when squeezebottle 30 is squeezed, but would permit air to be vented into squeezebottle 30 upon release. A nozzle is preferably attached to discharge opening 39 of squeezebottle 30, after filling bag 10, to enable easier directing of dispensed fluid. The nozzle may contain a suckback valve to prevent air being sucked into bag 10 through the nozzle after the squeezebottle is released. Such a construction enables bag 10 to collapse axially, reinverting toward discharge opening 39 as fluid is dispensed.

Thin plastic bag 10 may be thermoformed onto mandrel 20 from a heated plastic film rather than forming a bag separately and then placing it onto the mandrel. Adhesive stripe 18 could be applied to bag 10 on mandrel 20 by rotating mandrel 20 horizontally under a glue gun.

Other alternatives exist for inverting bag 10. For example, mechanical grippers on top end 22 of mandrel 20 may be used to grip top end 16 of bag 10. Another alternative is to thermoform thin plastic bag 10 over mandrel 20 such that dovetail notches, or similarly shaped undercuts, on top end 22 grip thin plastic bag 10 when mandrel 20 is withdrawn, thereby frictionally inverting the bag, but releasing it after full inversion.

In yet another alternative, mandrel 20 may be fully withdrawn in about one second from thermoformed bag 10. If the fit of bag 10 on mandrel 20 provides minimal air gap between mandrel 20 and bag 10, mandrel 20 may invert bag 10 as it is withdrawn. That is, if there is a substantially air-tight fit between mandrel 20 and the inside of bag 10 when mandrel 20 first moves, closed end 16 of bag 10 follows mandrel 20 until bag 10 is nearly inverted. If withdrawal is rapid enough, bag 10 will be completely inverted. Even if bag 10 is formed separately from mandrel 20, it is believed that this inversion alternative will work reliably.

In another embodiment of the present invention, the adhesive may be activated by steam heat instead of induction heating. The compressed gas blown through the radial passages of the mandrel may be 250° F. steam, for example. Blowing compressed steam through the radial passages presses the thin flexible bag and the stripe of adhesive against the inner side wall of the outer container while its heat simultaneously activates the continuous stripe of heat-activated adhesive to form a bond between the thin plastic bag and the continuous inner side wall of the outer plastic container. In this embodiment the mandrel need not be non-metallic.

A particularly preferred embodiment of the method for sealing an inner bag to an outer container may be as hereinafter described. Thin plastic bag 10 is preferably made from a 4 mil laminate comprising a center layer of 1 mil EVOH and outer layers of linear low density polyethylene. Bag 10 is thermoformed over mandrel 20 by using a VAC thermoformer, model no. R-12, made by Atlas VAC Company of Cincinnati, Ohio. This machine is set at heating temperatures of 130° C. to 140° C. for times ranging from 8 to 16 seconds. The draw ratio is approximately 4:1. Consequently, the closed end 16 of thin plastic bag 10 remains 4 mils thick while the open end 14 is drawn down to about 1 mil thick. Open end 14 is trimmed manually to the desired bag length by pressing a blade against mandrel 20 while rotating the mandrel. Once bag 10 is thermoformed onto mandrel 20, it remains thereon for application of adhesive stripe 18 and insertion into outer container 30. Mandrel 20 is cast from Uralite TM, a trademark of Hexel Company of Chatsworth, Calif. Mandrel 20 is cast using the outer container 30 as the mold. Therefore, thin plastic bags 10 which are thermoformed over mandrel 20 fit the inside of outer container 30 snugly. Mandrel 20 has a plurality of 1 mm diameter compressed air radial passages 26 spaced about 5 mm apart along a line which circumscribes the mandrel at a point where the heat seal is to be made.

Open end 14 of bag 10 extends from top end 22 of mandrel 20 to just below the line of passages 26. On the exterior of bag 10 is applied a 3 mm wide stripe of heat-activated adhesive 18 at the same axial position as passages 26. The stripe of adhesive is preferably made of 3M Jet-melt #3748-TC hot melt adhesive, made by 3M Corp., of St. Paul, Minn. It is a low softening temperature material about 5 mils thick. It has ferrous oxide mixed in when applied or when the adhesive is extruded into plugs for use in commercial hot-melt glue guns. The adhesive is applied from such a glue gun as mandrel 20 rotates bag 10 horizontally underneath the glue gun.

Outer container 30 is preferably a Neat Squeeze TM toothpaste dispenser, a Trademark of The Procter & Gamble Company of Cincinnati, Ohio. Outer container 30 has continuous inner side wall 34 having an inward taper toward shoulder 32 of about a one half degree included angle. Continuous inner side wall 34 has an oval cross-section and is a laminate made of 1 mil EVOH in the center, surrounded by linear low density polyethylene. Inner side wall 34 has a total thickness of approximately 30 mils.

Outer container 30, bag 10 and inserted mandrel 20 are placed together inside induction coil 50 for induction heating of adhesive stripe 18. A compressed air source provides 20–30 psig air to passages 26 at the end of the adhesive heating cycle and during cooling before mandrel 20 is withdrawn.

Induction sealing coil 50 is preferably rectangular in cross-section, having a height of 3.2 mm, an inner radius of 57 mm, and an outer radius of 73 mm. Induction coil 50 is preferably made of copper and is water cooled when connected to an RF generator, model no. T53-KC-SW, made by Lepel Company of New York, N.Y. The spacing between oval outer container 30 and induction coil 50 varies between 25 mm and 13 mm. Good adhesive bonds can be generated in less than 2 seconds. When mandrel 20 remains inserted for one second after RF generator power is turned off, sufficient cooling occurs for the heat seal to become stable. Thereafter mandrel 20 may be removed without disturbing the seal.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for sealing a thin plastic bag having an open end to a continuous inner side wall of an outer plastic container, said outer plastic container having an open bottom end, a discharge opening and a midpoint, said method comprising the steps of:
   a) placing said thin plastic bag over a non-metallic mandrel, said mandrel having a top end, said thin plastic bag having a circumference at said open end and a closed end at said top end of said mandrel, said thin plastic bag also having a continuous stripe of heat-activated adhesive bonded to said circumference at said open end, said heat-activated adhesive having metal particles therein;
   b) inserting said top end of said mandrel, having said thin plastic bag placed over said top end, into said open bottom end of said outer plastic container; and
   c) generating a magnetic induction field near said continuous stripe of heat-activated adhesive positioned at said midpoint of said outer container, said field having a strength to generate sufficient heat in said heat-activated adhesive having metal particles therein to form a bond between said thin plastic bag and said continuous inner side wall of said outer plastic container.

2. The method of claim 1 wherein said mandrel has radial passages connected to a compressed gas source, said radial passages being positioned inside said thin plastic bag underneath said continuous stripe of heat-activated adhesive, said method further comprising the step of blowing compressed gas through said radial passages to press said thin plastic bag and said stripe of adhesive against said inner side wall of said outer container.

3. The method of claim 1 further comprising the steps of:
   d) removing said magnetic induction field;
   e) retaining said mandrel inserted in said thin plastic bag until said heat-activated adhesive cools sufficiently that said mandrel may be withdrawn from said thin plastic bag without disturbing said bond; and
   f) withdrawing said mandrel from said thin plastic bag.

4. The method of claim 3 wherein said step of withdrawing said mandrel from said thin plastic bag further comprises the step of inverting said thin plastic bag by an inverting means as said mandrel is withdrawn.

5. The method of claim 4 wherein said inverting means comprises vacuum holes in said top end of said mandrel, said vacuum holes connected to a vacuum from a vacuum source, said vacuum gripping said closed end of said thin plastic bag during mandrel withdrawal.

6. The method of claim 4 wherein said inverting means comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

7. The method of claim 1 wherein said thin plastic bag comprises a half bag, said half bag having an open end just below said midpoint of said outer plastic container when said mandrel is fully inserted into said outer plastic container.

8. The method of claim 1 wherein said step of placing said thin plastic bag over a non-metallic mandrel comprises thermoforming said plastic bag onto said mandrel.

9. A method for sealing a thin plastic bag having an open end to a continuous inner side wall of an outer plastic container, said outer plastic container having an open bottom end, a discharge opening and a midpoint, said method comprising the steps of:
   a) placing said thin plastic bag over a non-metallic mandrel, said mandrel having a top end and radial passages connected to a compressed air source, said radial passages being positioned inside said thin plastic bag, said thin plastic bag having a circumference at said open end and a closed end at said top end of said mandrel, said thin plastic bag also having a continuous stripe of heat-activated adhesive bonded to said circumference at said open end, said heat-activated adhesive having metal particles therein;
   b) inserting said top end of said mandrel, having said thin plastic bag placed over said top end, into said open bottom end of said outer plastic container;
   c) generating a magnetic induction field near said continuous stripe of heat-activated adhesive positioned at said midpoint of said outer container, said field having a strength to generate sufficient heat in said heat-activated adhesive having metal particles therein to form a bond between said thin plastic bag and said continuous inner side wall of said outer plastic container;
   d) blowing compressed air through said radial passages of said mandrel to press said thin plastic bag and said stripe of adhesive against said inner side wall of said outer container;
   e) removing said magnetic induction field; and
   f) retaining said mandrel inserted in said thin plastic bag until said continuous stripe of heat-activated adhesive cools sufficiently that said mandrel may be withdrawn from said thin plastic bag without disturbing said bond.

10. The method of claim 9 further comprising the step of withdrawing said mandrel from said thin plastic bag, said withdrawing step causing said thin plastic bag to be inverted by an inverting means as said mandrel is withdrawn, and releasing said closed end of said thin plastic bag when it is near said open bottom end of said outer plastic container.

11. The method of claim 10 wherein said inverting means comprises vacuum holes in said top end of said mandrel, said vacuum holes connected to a vacuum from a vacuum source, said vacuum gripping said closed end of said thin plastic bag during mandrel withdrawal.

12. The method of claim 10 wherein said inverting means comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

13. The method of claim 9 wherein said thin plastic bag comprises a half bag, said half bag having an open end just below said midpoint of said outer plastic container when said mandrel is fully inserted into said outer plastic container.

14. The method of claim 9 wherein said step of placing said thin plastic bag over a non-metallic mandrel comprises thermoforming said plastic bag onto said mandrel.

15. A method for sealing a thin plastic bag having an open end to a continuous inner side wall of an outer plastic container, said outer plastic container having an open bottom end, a discharge opening and a midpoint, said method comprising the steps of:
   a) thermoforming said thin plastic bag over a non-metallic mandrel, said mandrel having a top end, said thin plastic bag having a circumference at said open end and a closed end at said top end of said mandrel, said thin plastic bag also having a continuous stripe of heat-activated adhesive bonded to said circumference at said open end, said heat-activated adhesive having metal particles therein;
   b) inserting said top end of said mandrel, having said thin plastic bag thermoformed over said top end, into said open bottom end of said outer plastic container; and
   c) generating a magnetic induction field near said continuous stripe of heat-activated adhesive positioned at said midpoint of said outer container, said field having a strength to generate sufficient heat in said heat-activated adhesive having metal particles therein to form a bond between said thin plastic bag and said continuous inner side wall of said outer plastic container.

16. The method of claim 15 wherein said mandrel has radial passages connected to a compressed air source, said radial passages being positioned inside said thin plastic bag underneath said continuous stripe of heat-activated adhesive, said method further comprising the step of blowing compressed air through said radial passages to press said thin flexible bag and said stripe of adhesive against said inner side wall of said outer container.

17. The method of claim 15 further comprising the steps of:
   d) removing said magnetic induction field;
   e) retaining said mandrel inserted in said thin plastic bag until said heat-activated adhesive cools sufficiently that said mandrel may be withdrawn from said thin plastic bag without disturbing said bond; and
   f) withdrawing said mandrel from said thin plastic bag.

18. The method of claim 17 wherein said step of withdrawing said mandrel from said thin plastic bag further comprises the step of inverting said thin plastic bag by an inverting means as said mandrel is withdrawn.

19. The method of claim 18 wherein said inverting means comprises vacuum holes in said top end of said mandrel, said vacuum holes connected to a vacuum from a vacuum source, said vacuum gripping said closed end of said thin plastic bag during mandrel withdrawal.

20. The method of claim 18 wherein said inverting means comprises a rapid withdrawal of said mandrel so that said closed end of said thin plastic bag maintains a substantially air-tight fit with said top end of said mandrel until said mandrel is nearly withdrawn, said rapid withdrawal providing sufficient inertia to fully invert said thin plastic bag.

21. A method for sealing a thin plastic bag having an open end to a continuous inner side wall of an outer plastic container, said outer plastic container having an open bottom end, a discharge opening and a midpoint, said method comprising the steps of:

a) placing said thin plastic bag over a mandrel, said mandrel having a top end and radial passages connected to a compressed gas source, said thin plastic bag having a circumference at said open end and a closed end at said top end of said mandrel, said thin plastic bag also having a continuous stripe of heat-activated adhesive bonded to said circumference at said open end, said radial passages being positioned inside said thin plastic bag underneath said continuous stripe of heat-activated adhesive;

b) inserting said top end of said mandrel, having said thin plastic bag placed over said top end, into said open bottom end of said outer plastic container such that said heat-activated adhesive is positioned at said midpoint of said outer container; and c) blowing compressed gas through said radial passages to press said thin flexible bag and said stripe of adhesive against said inner side wall of said outer container while simultaneously activating said continuous stripe of heat-activated adhesive to form a bond between said thin plastic bag and said continuous inner side wall of said outer plastic container.

* * * * *